(12) United States Patent
Tokumasu et al.

(10) Patent No.: US 7,834,508 B2
(45) Date of Patent: Nov. 16, 2010

(54) SLOT POSITIONS FOR A THREE-PHASE TWO-POLE ARMATURE WINDING WITH A SEVENTY-TWO SLOT ARMATURE CORE

(75) Inventors: Tadashi Tokumasu, Tokyo (JP); Masafumi Fujita, Yokohama (JP); Mikio Kakiuchi, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 124 days.

(21) Appl. No.: 12/250,363

(22) Filed: Oct. 13, 2008

(65) Prior Publication Data

US 2009/0096312 A1 Apr. 16, 2009

(30) Foreign Application Priority Data

Oct. 16, 2007 (JP) .............................. 2007-269462

(51) Int. Cl.
*H02K 3/28* (2006.01)
(52) U.S. Cl. ........................ 310/198; 310/202; 310/206
(58) Field of Classification Search ................. 310/198, 310/202, 203, 206, 207
See application file for complete search history.

(56) References Cited

U.S. PATENT DOCUMENTS

| | | | |
|---|---|---|---|
| 2,015,562 A | 9/1935 | Kilgore | |
| 2,778,962 A | 1/1957 | Taylor | |
| 2,778,963 A | 1/1957 | Habermann, Jr. | |
| 3,408,517 A * | 10/1968 | Willyoung | .................. 310/198 |
| 6,388,357 B1 | 5/2002 | Tokumasu | |
| 2007/0182267 A1 | 8/2007 | Neet | |

FOREIGN PATENT DOCUMENTS

GB 518135 2/1940

OTHER PUBLICATIONS

Communication and European Search Report mailed Jul. 31, 2009, in European Application No. 09151109.7.

* cited by examiner

*Primary Examiner*—Quyen Leung
*Assistant Examiner*—Eric Johnson
(74) *Attorney, Agent, or Firm*—Christensen O'Connor Johnson Kindness PLLC

(57) ABSTRACT

In an armature, the upper and lower coil pieces in the first and third parallel circuits are located at the $1^{st}$, $4^{th}$, $6^{th}$, $7^{th}$, $10^{th}$ and $12^{th}$ positions, and the upper and lower coil pieces in the second and fourth parallel circuits are located at the $2^{nd}$, $3^{rd}$, $5^{th}$, $8^{th}$, $9^{th}$ and $11^{th}$ positions, when relative positions of the upper and lower coil pieces in one of the first and second phase belts are indicated by positions counted in a direction separating away from a center of a pole.

13 Claims, 7 Drawing Sheets

SLOT POSITIONS FOR A THREE-PHASE TWO-POLE ARMATURE WINDING WITH A SEVENTY-TWO SLOT ARMATURE CORE

CROSS-REFERENCE TO RELATED APPLICATIONS

This application is based upon and claims the benefit of priority from prior Japanese Patent Application No. 2007-269462, filed Oct. 16, 2007, the entire contents of which are incorporated herein by reference.

BACKGROUND OF THE INVENTION

1. Field of the Invention

The present invention relates to an armature having an armature core with 72 slots, and a three-phase two-pole armature winding wound in two layers and housed in the slots.

2. Description of the Related Art

In a large-capacity dynamo-electric machine, an armature winding is provided in two layers in slots with upper coil pieces and lower coil pieces provided in a laminated core, and the two layers of armature winding are connected in series to provide a high voltage, thereby increasing an apparatus capacity. However, as an armature winding rises in voltage, the thickness of a main insulator of the armature winding needs to be increased to withstand the voltage. As a result, the cross-sectional area of a conductor of the armature winding is decreased. This increases a current density and loss.

Particularly, in a machine adopting indirect cooling system for cooling an armature winding from the outside of a main insulator, a thick main insulator increases thermal resistance and temperature of an armature winding. Therefore, an armature winding is divided into two or more parallel circuits to decrease in voltage and main insulator thickness, while keeping an apparatus capacity, thereby increasing a cooling capacity with decreased loss. Particularly, in an indirect cooling large-capacity machine, it is common to increase the number of slots to increase the peripheral length of an armature winding to be cooled. Therefore, it is necessary to use an armature winding having three or more parallel circuits.

However, if a two-pole armature adopts an armature winding with three or more parallel circuits, it is difficult to generate the same voltage in parallel circuits. Therefore, a circulating current occurs generated among the parallel circuits, and increases loss in the armature winding. To decrease the loss caused by the circulating current, it is necessary to minimize the unbalance among the voltages generated in the parallel circuits. It is thus necessary to give special consideration to arrangement of coil pieces in each parallel circuit in each phase belt.

An explanation will be given on an example of improvement in arrangement of coil pieces by referring to a developed perspective view of an armature winding in FIG. 7, showing a part for one phase. FIG. 7 shows an example of an armature winding with four parallel circuits applicable to a dynamo-electric machine with three phases, two poles and seventy-two slots, according to U.S. Pat. No. 2,778,962 (hereinafter, called Literature 1). FIG. 7 shows a part for only one phase. It is however appreciated that parts for the other two phases are obtained by displacing the configuration of the armature winding phase of FIG. 7 by 120° and 240°, respectively.

In FIG. 7, when parallel circuits are indicated by numbers 1 to 4 (parenthetic numbers 1, 2, 3 and 4), twelve upper coil pieces 15 and lower coil pieces 16 in a first phase belt 17 are numbered 1, 2, 2, 1, 2, 1, 1, 2, 1, 2, 2 and 1 sequentially from the center of a pole, and twelve upper coil pieces 15 and lower coil pieces 16 in a second phase belt 18 are numbered 3, 4, 4, 3, 4, 3, 3, 4, 3, 4, 4 and 3 sequentially from the center of a pole, thereby decreasing a voltage deviation (an absolute value of deviation from an average phase voltage) in the parallel circuits and a phase difference deviation circuits (a phase angle deviation from an average phase voltage) in the parallel circuits.

To realize the above connection, in FIG. 7, fourteen jumper wires 20a are provided for each phase at a connection side coil end 19a, but no jumper wires are provided at a coil end 19b opposite to the connection side.

As for the voltage deviation and phase angle deviation in parallel circuits, U.S. Pat. No. 2,778,963 (hereinafter, called Literature 2) indicates that a reference value of voltage deviation is 0.4% or lower is, and a reference value of phase angle deviation is 0.15° or lower. However, in the Literature 1, the voltage deviation is 0.12% and the phase angle deviation is 0° in the parallel circuits, which are well balanced compared with the above reference values, and are enough effective to decrease a circulating current.

The connection method disclosed in the Literature 1 is electrically suitable with the generated voltage deviation reduced to a minimum, but is mechanically complex in the structure. Namely, to configure the armature winding shown in FIG. 7 according to the Literature 1, it is necessary to provide fourteen jumper wires 20a for each phase at the connection side coil end 19a, to connect the upper coil pieces 15 and the lower coil pieces 16. Connection of the jumper wires 20a is an additional work, and it is important to ensure the insulation and fixing strength of the jumper wires 20a. There are twenty locations per a phase to connect the upper and lower coil pieces 15 and 16, except a location to connect a lead-out connection conductor 21, at the connection side coil end 19a. Fourteen locations per a phase among these twenty locations are connected by the jumper wires 20a. As the jumper wires 20a are tightly arranged with small spaces, the jumper wire connection work is uneasy, and it is difficult to ensure the insulation and fixing strength of the jumper wire owing to interference between the jumper wires 20a and between the jumper wire 20a and lead-out connection conductor 21.

BRIEF SUMMARY OF THE INVENTION

Accordingly, it is an object of the present invention to provide an armature comprising an armature core with two poles and 72 slots, and an armature winding that is a three-phase two-pole armature winding wound in two layers and housed in the slots, each phase having four parallel circuits, wherein the unbalance among the voltages in the parallel circuits is decreased, losses caused by a circulating current among the parallel circuits are decreased, the workability in locations to connect jumper wires is improved, and the insulation and fixing strength are easily ensured in the configuration of the armature.

According to one aspect of the present invention, there is provided an armature comprising an armature core with 72 slots, and an armature winding that is a three-phase two-pole armature winding wound in two layers, and is housed in the slots, each phase having first, second, third and fourth parallel circuits, each parallel circuit having a serial coil, each serial coil having upper and lower coil pieces connected to each other at a connection side coil end and at a coil end opposite to the connection side, the coil pieces divided into first and second phase belts, the upper and lower coil pieces in the first and third parallel circuits being located at the $1^{st}$, $4^{th}$, $6^{th}$, $7^{th}$, $10^{th}$ and $12^{th}$ positions, and the upper and lower coil pieces in the second and fourth parallel circuits being located at the $2^{nd}$, $3^{rd}$, $5^{th}$, $8^{th}$, $9^{th}$ and $11^{th}$ positions, when relative positions of the upper and lower coil pieces in one of the first and second phase belts are indicated by positions counted in a direction separating away from a center of a pole.

DETAILED DESCRIPTION OF THE INVENTION

Hereinafter, embodiments of the present invention will be explained with reference to the accompanying drawings.

The embodiments are based on an armature described below. The armature includes an armature core with 72 slots, and an armature winding that is a three-phase two-pole armature winding wound in two layers and housed in the slots, each phase having first, second, third and fourth parallel circuits. Each of the parallel circuits has a serial coil, and each of the serial coils has upper coil pieces and lower coil pieces, which are connected to each other at a coil end on the connection side and a coil end opposite to the connection side. These coil pieces are divided into first and second phase belts.

First Embodiment

Figure 1:
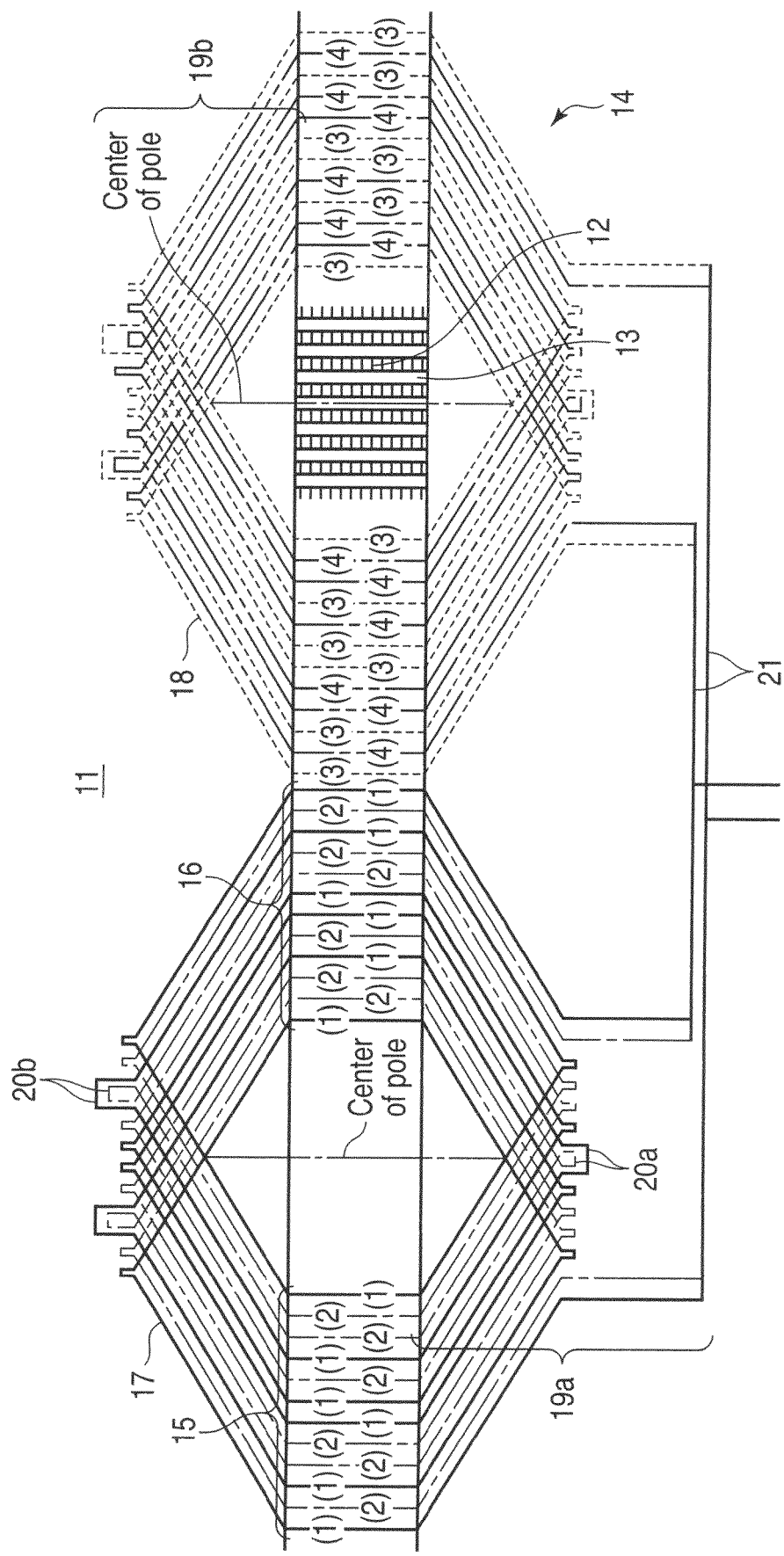
FIG. 1 is a developed perspective view of a first embodiment of an armature according to the present invention, showing a part for one phase.

FIG. 1 is a developed perspective view of an armature according to a first embodiment of the present invention, showing a part for one phase. An armature 11 has seventy-two slots 13 in an armature core 12 consisting of a laminated core. A two-pole three-phase armature winding (armature coil) 14 having four parallel circuits is provided in two layers in the slots 13.

The armature winding 14 of each phase has upper coil pieces 15 housed in the upper part of the slots 13, and lower coil pieces 16 housed in the lower part of the slots 13. The end portions of these upper and lower coil pieces 15 and 16 are connected in series at a connection side coil end 19a, and at an opposite-side coil end 19b that is opposite to the connection side coil end in the axial direction and not connected to a winding lead-out portion. The armature winding 14 also has a first phase belt 17 and a second phase belt 18, each of which houses the upper and lower coil pieces 15 and 16 in twelve slots 13 of the armature core 12.

Here, each of the phase belts 17 and 18 means a group of coil pieces to form a N-pole or a S-pole at a certain moment.

The armature winding 14 of each phase has four parallel circuits. The parallel circuits are identified by numbers 1, 2, 3 and 4 as shown in the drawing. The circuit numbers are merely signs to identify the circuits. Any signs may be assigned to the circuits in any order.

The upper coil pieces 15 in each of the phase belts 17 and 18 are connected to the corresponding lower coil pieces 16 separated by a fixed coil pitch, at the connection side coil end 19a and opposite-side coil end 19b, thereby forming four parallel circuits. The parallel circuits are connected in parallel through the lead-out conductor 21 provided at the connection side coil end 19a, forming the armature winding 14.

FIG. 1 shows an example adopting a small coil pitch of ⅔. This is just for making the drawing easy to see. A coil pitch is not limited to this value.

In FIG. 1, by providing four jumper wires 20a for each phase at the connection side coil end 19a of each of the phase belts 17 and 18, and eight jumper wires 20a for each phase at the opposite side coil end 19b, the parallel circuits corresponding to the upper and lower coil pieces 15 and 16 in the first phase belt 17 are numbered 1, 2, 2, 1, 2, 1, 1, 2, 2, 1, 2, 1 in the direction separating away from the center of a pole (sequentially from the center of a pole), and the parallel circuits of the upper and lower coil pieces 15 and 16 in the second phase belt 18 are numbered 3, 4, 4, 3, 4, 3, 3, 4, 4, 3, 4, 3 in the direction separating away from the center of a pole (sequentially from the center of a pole).

Therefore, when the relative positions of the upper and lower coil pieces 15 and 16 in one of the phase belts 17 and 18 are indicated by the positions in the direction separating away from the center of a pole, the positions of the upper and lower coil pieces 15 and 16 in each parallel circuit are as shown in Table 1. Six upper and lower coil pieces 15 and 16 in each of the first and third parallel circuits are located at the $1^{st}$, $4^{th}$, $6^{th}$, $7^{th}$, $10^{th}$ and $12^{th}$ positions from the center of a pole, and six upper and lower coil pieces 15 and 16 in each of the second and fourth parallel circuits are located at the $2^{nd}$, $3^{rd}$, $5^{th}$, $8^{th}$, $9^{th}$ and $10^{th}$ positions from the center of a pole.

TABLE 1

Arrangement of upper and lower coils in the first embodiment

| | | Relative positions from the center of pole | | | | | |
|---|---|---|---|---|---|---|---|
| | | 1 | 2 | 3 | 4 | 5 | 6 |
| Parallel circuits 1 and 3 | Upper coil piece | 1 | | | 1 | | 1 |
| | Lower coil piece | 1 | | | 1 | | 1 |
| Parallel circuits 2 and 4 | Upper coil piece | | 1 | 1 | | 1 | |
| | Lower coil piece | | 1 | 1 | | 1 | |

| | | Relative positions from the center of pole | | | | | |
|---|---|---|---|---|---|---|---|
| | | 7 | 8 | 9 | 10 | 11 | 12 |
| Parallel circuits 1 and 3 | Upper coil piece | 1 | | | 1 | | 1 |
| | Lower coil piece | 1 | | | 1 | | 1 |
| Parallel circuits 2 and 4 | Upper coil piece | | 1 | 1 | | 1 | |
| | Lower coil piece | | 1 | 1 | | 1 | |

Next, an explanation will be given on the unbalance among the voltages generated in one phase. As a means for evaluating the unbalance as a numeric value, the following definition is usually adopted. Namely, the p. u. indication of the voltage in only one of the parallel circuits in one phase is a ratio between an open-circuit voltage of that parallel circuit and an average voltage (a phase voltage) of the whole phase. This indicates the degree of unbalance between the voltages of that parallel circuit and whole phase voltage. Similarly, a phase angle deviation in an open-circuit voltage and a phase voltage generated in one parallel circuit indicates the degree of unbalance between the phase angles of that parallel circuit and whole phase.

Table 2 shows the balance among the voltages generated in the armature according to the first embodiment of the present invention. However, as the balance varies with a coil pitch in this embodiment, Table 2 shows the case where a coil pitch is 30/36 (83.33%). As shown in Table 2, in the armature according to the first embodiment of the present invention, a voltage deviation (deviation from 1.0 of the p. u. voltage) is 0.12% maximum, and a phase angle deviation is 0.0°, which are equivalent to the values in the Literature 1, and satisfy the reference voltage deviation of 0.4% and reference phase angle deviation of 0.15° or lower in the Literature 2.

TABLE 2

Voltage balance in the first embodiment

| Parallel circuit | 1 | 2 | 3 | 4 |
| --- | --- | --- | --- | --- |
| Voltage (p.u.) | 0.9988 | 1.0012 | 0.9988 | 1.0012 |
| Voltage phase (degree) | 0.000 | 0.000 | 0.000 | 0.000 |

Table 3 shows the maximum values of voltage deviation and phase angle deviation changed by a coil pitch (a winding pitch) in the first embodiment of the present invention. The balance may be lower than the value in the Literature 1 at some coil pitches. When the coil pitch is in a range of 24/36 to 34/36, the reference values shown in the Literature 2 are obtained. The values satisfy the reference voltage deviation of 0.4% and phase angle deviation of 0.15°.

The coil pitch (winding pitch) mentioned here means a ratio between the number of slots and a magnetic pole pitch, that is, the interval between the upper and lower coil pieces counted by the average number of slots, concretely the difference in the slot numbers.

TABLE 3

Relation between coil pitch and unbalanced voltage in the first embodiment

| Coil pitch | 34/36 | 32/36 | 30/36 | 28/36 | 26/36 | 24/36 |
| --- | --- | --- | --- | --- | --- | --- |
| Voltage deviation | 0.38% | 0.25% | 0.12% | 0.02% | 0.18% | 0.34% |
| Phase angle deviation | 0.0° | 0.0° | 0.0° | 0.0° | 0.0° | 0.0° |

As described above, in the first embodiment of the present invention, the balance equivalent to the value in the Literature 1 can be realized with respect to the voltages in parallel circuits, and a circulating current can be decreased. Further, the total number of jumper wires 20a and 20b are twelve per a phase in the first embodiment of the present invention, which is less than fourteen per a phase shown in FIG. 7, and eight out of twelve jumper wires are provided at the connection side coil end 19a, and four are dispersedly provided at the opposite-side coil end 19b. Therefore, the spaces among the wires of the jumper wires 20a and 20b are increased, and the jumper wires 20b provided at the opposite side coil end 19b are not interfered with the lead-out conductor 21. This improves the workability of connecting the jumper wires 20a and 20b, ensures the insulation and fixing strength of the connection part without difficulty, and provides a reliable armature.

This embodiment is not limited to the configuration shown in the drawing. The lead-out position may be changed, and the coil pieces placed at the electrically equivalent positions in the parallel circuits 1 and 3 may be replaced.

Second Embodiment

Figure 2:
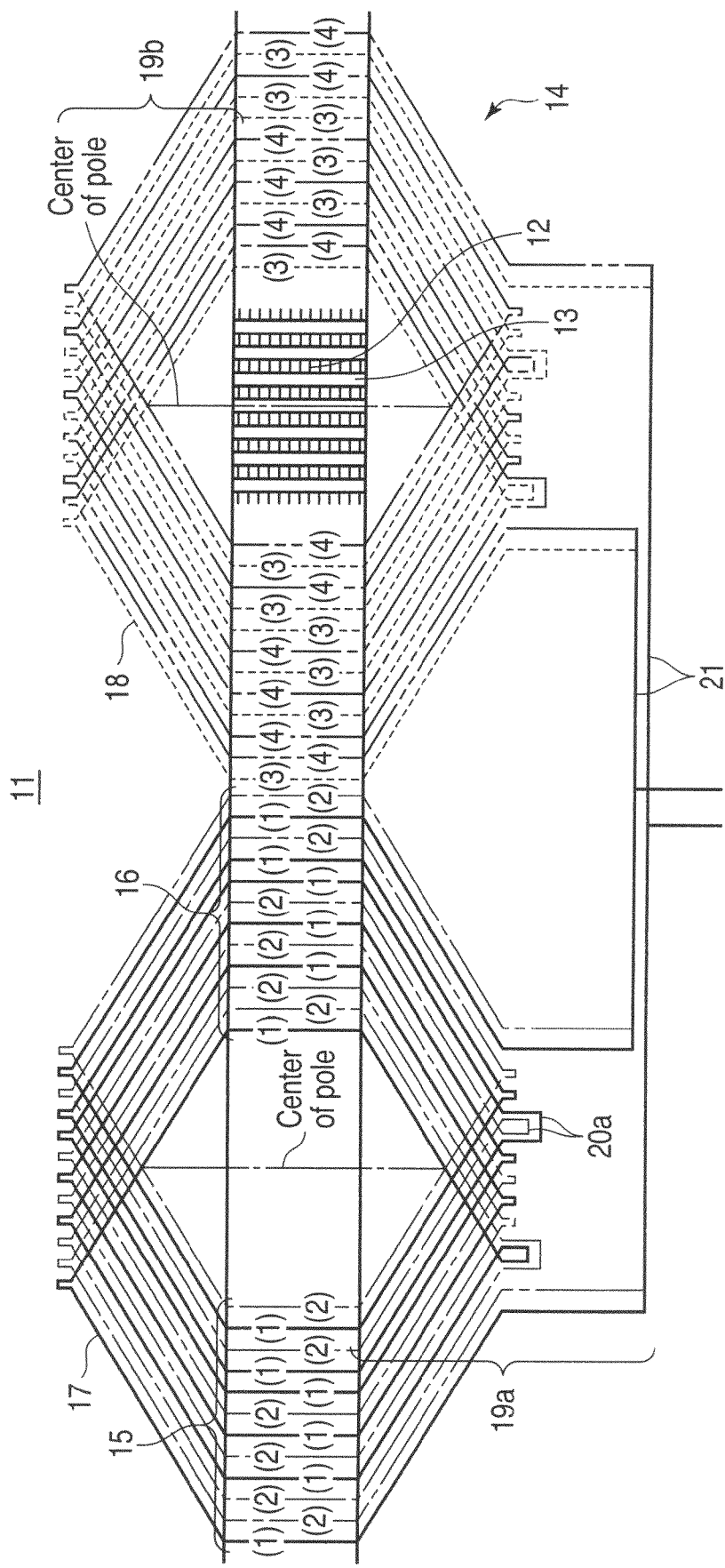
FIG. 2 is a developed perspective view of a second embodiment of an armature according to the present invention, showing a part for one phase.

Next, a second embodiment of the armature according to the present invention will be explained by referring to FIG. 2. FIG. 2 is a developed perspective view of an armature according to a second embodiment of the present invention, showing a part for one phase. An armature 11 has seventy-two slots 13 in an armature core 12 consisting of a laminated core. A two-pole three-phase armature winding 14 having four parallel circuits is provided in two layers in the slots 13.

The armature winding 14 of each phase has upper coil pieces 15 housed in the upper part of the slots 13, and lower coil pieces 16 housed in the lower part of the slots 13. The end portions of these upper and lower coil pieces 15 and 16 are connected in series at a connection side coil end 19a, and at an opposite side coil end 19b that is opposite to the connection side coil end in the axial direction and not connected to a winding lead-out portion. The armature winding 14 also has a first phase belt 17 and a second phase belt 18, each of which houses the upper and lower coil pieces 15 and 16 in twelve slots 13 of the armature core 12.

The armature winding 14 of each phase has four parallel circuits. The parallel circuits are identified by numbers 1, 2, 3 and 4.

The upper coil pieces 15 in each of the phase belts 17 and 18 are connected to the corresponding lower coil pieces 16 separated by a fixed coil pitch, at the connection side coil end 19a and opposite-side coil end 19b, thereby forming four parallel circuits. The parallel circuits are connected in parallel through the lead-out conductor 21 provided at the connection side coil end 19a, forming the armature winding 14.

In FIG. 2, by providing eight jumper wires 20a per a phase at the connection side coil end 19a of each of the phase belts 17 and 18, the parallel circuits corresponding to the upper coil pieces 15 in the first phase belt 17 are numbered 2, 1, 2, 1, 1, 2, 1, 2, 1, 2, 2, 1 in the direction separating away from the center of a pole, and the parallel circuits corresponding to the lower coil pieces 16 are numbered 1, 2, 2, 1, 2, 1, 2, 1, 1, 2, 1, 2 in the direction separating away from the center of a pole. The parallel circuits corresponding to the upper coil pieces 15 in the second phase belt 18 are numbered 4, 3, 4, 3, 3, 4, 3, 4, 3, 4, 4, 3 in the direction separating away from the center of a pole, and the parallel circuits corresponding to the lower coil pieces 16 are numbered 3, 4, 4, 3, 4, 3, 4, 3, 3, 4, 3, 4 in the direction separating away from the center of a pole.

Therefore, when the relative positions of the upper and lower coil pieces 15 and 16 in one of the phase belts 17 and 18 are indicated by the positions from the center of a pole, the positions of the upper and lower coil pieces 15 and 16 in each parallel circuit are as shown in Table 4. Six upper coil pieces 15 in each of the first and third parallel circuits are located at the $2^{nd}$, $4^{th}$, $5^{th}$, $7^{th}$, $9^{th}$, and $12^{th}$ positions from the center of a pole, and six lower coil pieces 16 are located at the $1^{st}$, $4^{th}$, $6^{th}$, $8^{th}$, $9^{th}$ and $11^{th}$ positions from the center of a pole. Six upper coil pieces 15 in each of the second and fourth parallel circuits are located at the $1^{st}$, $3^{rd}$, $6^{th}$, $8^{th}$, $10^{th}$ and $11^{th}$ positions from the center of a pole, and six lower coil pieces 16 are located at the $2^{nd}$, $3^{rd}$, $5^{th}$, $7^{th}$, $10^{th}$ and $12^{th}$ positions from the center of a pole.

TABLE 4

Arrangement of upper and lower coils in the second embodiment

|  |  | Relative positions from the center of pole | | | | | |
|---|---|---|---|---|---|---|---|
|  |  | 1 | 2 | 3 | 4 | 5 | 6 |
| Parallel circuits 1 and 3 | Upper coil piece |  | 1 |  | 1 | 1 |  |
|  | Lower coil piece | 1 |  |  | 1 |  | 1 |
| Parallel circuits 2 and 4 | Upper coil piece | 1 |  | 1 |  |  | 1 |
|  | Lower coil piece |  | 1 | 1 |  | 1 |  |

|  |  | Relative positions from the center of pole | | | | | |
|---|---|---|---|---|---|---|---|
|  |  | 7 | 8 | 9 | 10 | 11 | 12 |
| Parallel circuits 1 and 3 | Upper coil piece | 1 |  | 1 |  |  | 1 |
|  | Lower coil piece |  | 1 | 1 |  | 1 |  |
| Parallel circuits 2 and 4 | Upper coil piece |  | 1 |  | 1 | 1 |  |
|  | Lower coil piece | 1 |  |  | 1 |  | 1 |

Table 5 shows the balance among the voltages generated in the armature winding according to the second embodiment of the present invention. The balance does not vary with a coil pitch in this embodiment. As shown in Table 5, in the armature according to the second embodiment of the present invention, a voltage deviation (deviation from 1.0 of the p. u. voltage) is 0.39% maximum, and a phase angle deviation is 0.0°, which are lower than the values in the Literature 1, but satisfy the reference voltage deviation of 0.4% and reference phase angle deviation of 0.15° or lower in the Literature 2.

TABLE 5

Voltage balance in the second embodiment

| Parallel circuit | 1 | 2 | 3 | 4 |
|---|---|---|---|---|
| Voltage (p.u.) | 1.0039 | 0.9961 | 1.0039 | 0.9961 |
| Voltage phase (degree) | 0.078 | −0.078 | 0.078 | −0.078 |

Figure 7:
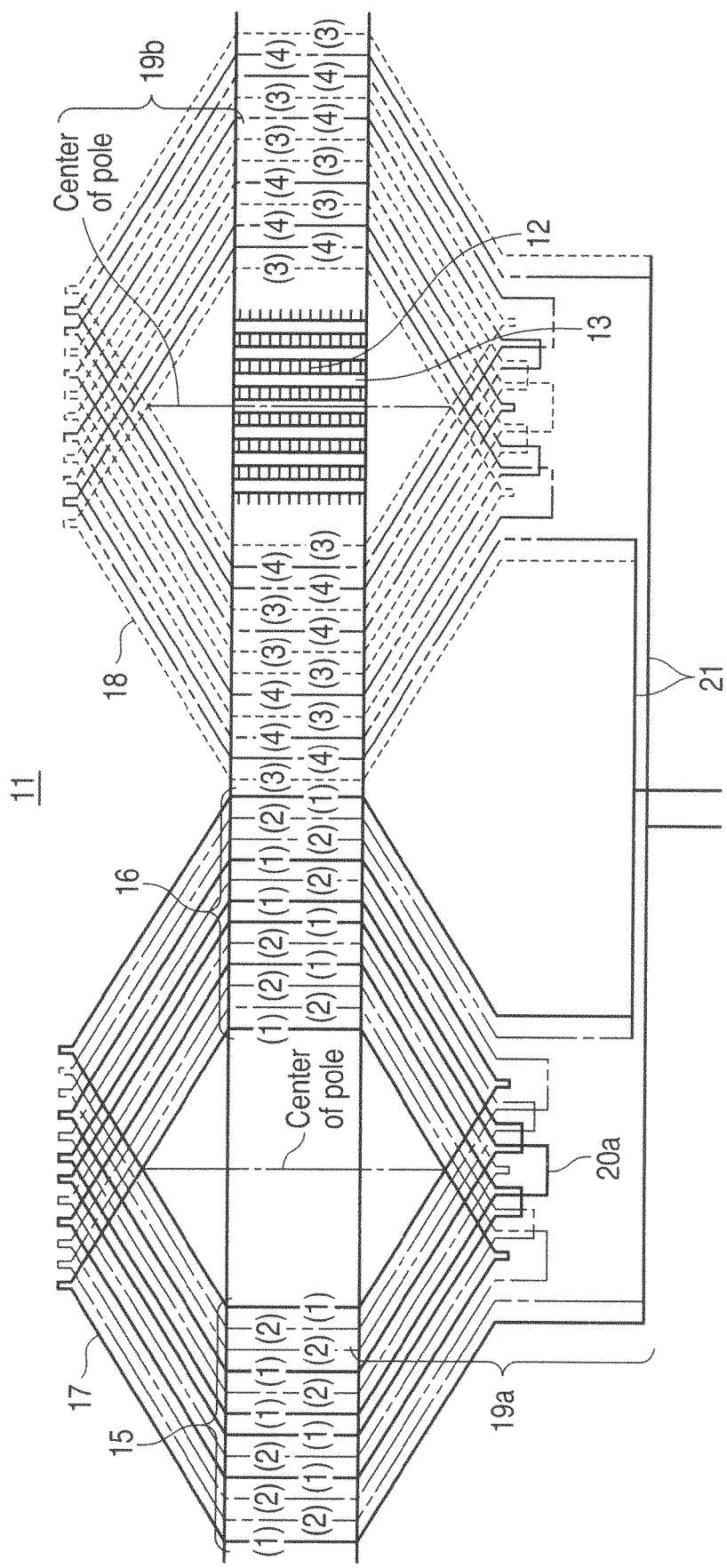
FIG. 7 is a developed perspective view of a conventional armature, showing a part for one phase.

As described above, in the second embodiment of the present invention, the balance satisfying the reference values in the Literature 2 can be realized with respect to the voltages in parallel circuits, and a circulating current can be decreased. Further, in the second embodiment of the present invention, the jumper wires 20a are provided only on the connection side as shown in FIG. 7. The number of jumper wires 20a on the connection side can be decreased to eight per a phase. Therefore, the spaces among the jumper wires 20a are increased. This improves the workability of connecting the jumper wires, ensures the fixing strength without difficulty, and provides a reliable armature. Further, as the number of jumper wires is decreased, the number of man-hours needed to provide the jumper wires is off course decreased.

This embodiment is not limited to the configuration shown in the drawing. The lead-out position may be changed, and the coil pieces placed at the electrically equivalent positions in the parallel circuits 1 and 3 may be replaced.

Third Embodiment

Figure 3:
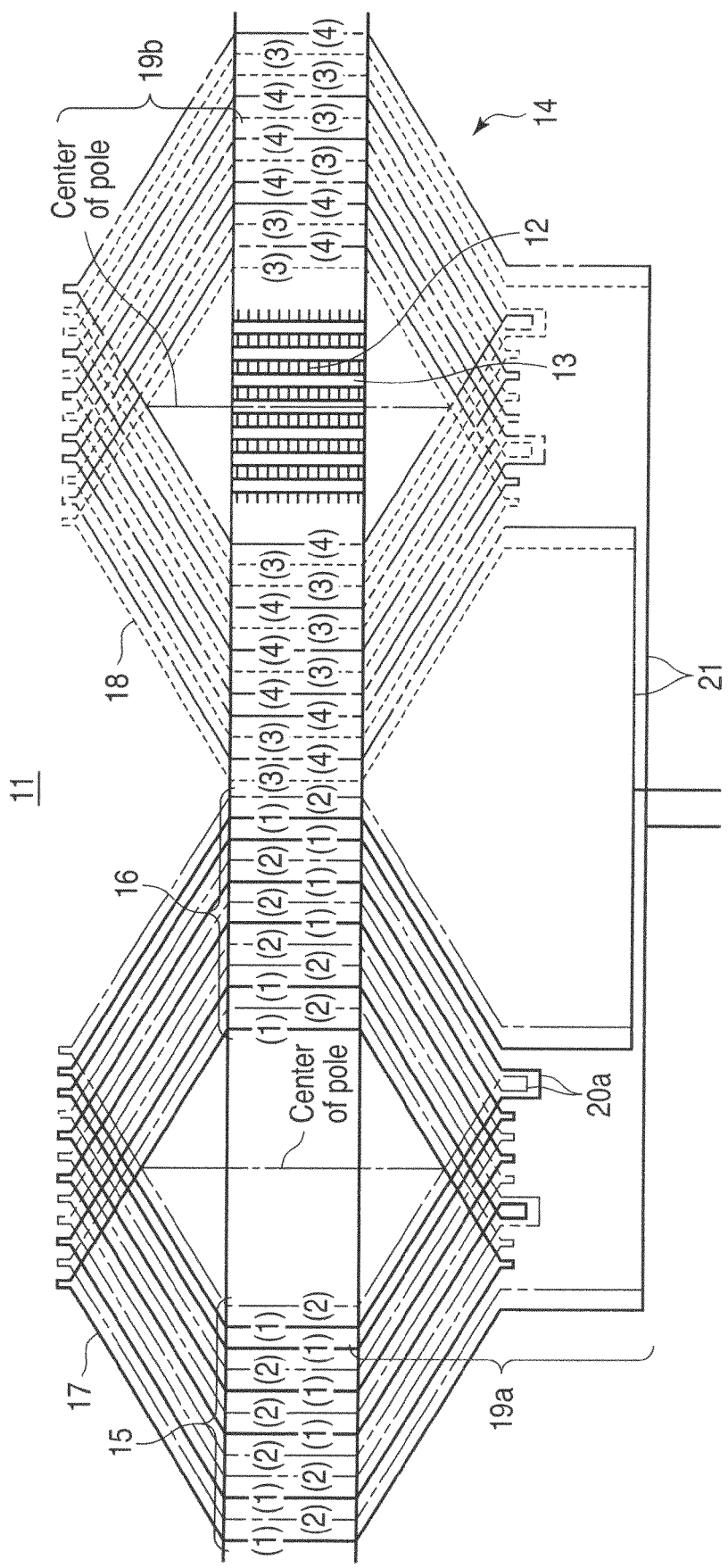
FIG. 3 is a developed perspective view of a third embodiment of an armature according to the present invention, showing a part for one phase.

Next, a third embodiment of the armature according to the present invention will be explained by referring to FIG. 3. FIG. 3 is a developed perspective view of an armature according to a third embodiment of the present invention, showing a part for one phase. An armature 11 has seventy-two slots 13 in an armature core 12 consisting of a laminated core. A two-pole three-phase armature winding 14 having four parallel circuits is provided in two layers in the slots 13.

The armature winding 14 of each phase has upper coil pieces 15 housed in the upper part of the slots 13, and lower coil pieces 16 housed in the lower part of the slots 13. The end portions of these upper and lower coil pieces 15 and 16 are connected in series at a connection side coil end 19a, and at an opposite side coil end 19b that is opposite to the connection side coil end in the axial direction and not connected to a winding lead-out portion. The armature winding 14 also has a first phase belt 17 and a second phase belt 18, each of which houses the upper and lower coil pieces 15 and 16 in twelve slots 13 of the armature core 12.

The armature winding 14 of each phase has four parallel circuits. The parallel circuits are identified by numbers 1, 2, 3 and 4.

The upper coil pieces 15 in each of the phase belts 17 and 18 are connected to the corresponding lower coil pieces 16 separated by a fixed coil pitch, at the connection side coil end 19a and opposite side coil end 19b, thereby forming four parallel circuits. The parallel circuits are connected in parallel through the lead-out conductor 21 provided at the connection side coil end 19a, forming the armature winding 14.

In FIG. 3, by providing eight jumper wires 20a per a phase at the connection side coil end 19a of each of the phase belts 17 and 18, the parallel circuits corresponding to the upper coil pieces 15 in the first phase belt 17 are numbered 2, 1, 1, 2, 1, 2, 1, 2, 2, 1, 2, 1 in the direction separating away from the center of a pole, and the parallel circuits corresponding to the lower coil pieces 16 are numbered 1, 2, 1, 2, 2, 1, 2, 1, 2, 1, 1, 2 in the direction separating away from the center of a pole. The parallel circuits corresponding to the upper coil pieces 15 in the second phase belt 18 are numbered 4, 3, 3, 4, 3, 4, 3, 4, 4, 3, 4, 3 in the direction separating away from the center of a pole, and the parallel circuits corresponding to the lower coil pieces 16 are numbered 3, 4, 3, 4, 4, 3, 4, 3, 4, 3, 3, 4 in the direction separating away from the center of a pole.

Therefore, when the relative positions of the upper and lower coil pieces 15 and 16 in one of the phase belts 17 and 18 are indicated by the positions from the center of a pole, the positions of the upper and lower coil pieces 15 and 16 in each parallel circuit are as shown in Table 6. Six upper coil pieces 15 in each of the first and third parallel circuits are located at the $2^{nd}$, $3^{rd}$, $5^{th}$, $7^{th}$, $10^{th}$, and $12^{th}$ positions from the center of a pole, and six lower coil pieces 16 are located at the $1^{st}$, $3^{rd}$, $6^{th}$, $8^{th}$, $10^{th}$ and $11^{th}$ positions from the center of a pole. Six upper coil pieces 15 in each of the second and fourth parallel circuits are located at the $1^{st}$, $4^{th}$, $6^{th}$, $8^{th}$, $9^{th}$ and $11^{th}$ positions from the center of a pole, and six lower coil pieces 16 are located at the $2^{nd}$, $4^{th}$, $5^{th}$, $7^{th}$, $9^{th}$ and $12^{th}$ positions from the center of a pole.

TABLE 6

Arrangement of upper and lower coils in the third embodiment

|  |  | Relative positions from the center of pole | | | | | |
|---|---|---|---|---|---|---|---|
|  |  | 1 | 2 | 3 | 4 | 5 | 6 |
| Parallel circuits 1 and 3 | Upper coil piece |  | 1 | 1 |  | 1 |  |
|  | Lower coil piece | 1 |  | 1 |  |  | 1 |
| Parallel circuits 2 and 4 | Upper coil piece | 1 |  |  | 1 |  | 1 |
|  | Lower coil piece |  | 1 |  | 1 | 1 |  |

TABLE 6-continued

Arrangement of upper and lower coils in the third embodiment

| | | Relative positions from the center of pole | | | | | |
|---|---|---|---|---|---|---|---|
| | | 7 | 8 | 9 | 10 | 11 | 12 |
| Parallel circuits 1 and 3 | Upper coil piece | 1 | | | 1 | | 1 |
| | Lower coil piece | | 1 | | | 1 | 1 |
| Parallel circuits 2 and 4 | Upper coil piece | | | 1 | 1 | | 1 |
| | Lower coil piece | 1 | | 1 | | | 1 |

Table 7 shows the balance among the voltages generated in the armature according to the third embodiment of the present invention. The balance does not vary with a coil pitch in this embodiment. As shown in Table 7, in the armature winding according to the third embodiment of the present invention, a voltage deviation (deviation from 1.0 of the p. u. voltage) is 0.39% maximum, and a phase angle deviation is 0.0°, which are lower than the values in the Literature 1, but satisfy the reference voltage deviation of 0.4% and reference phase angle deviation of 0.15° or lower in the Literature 2.

TABLE 7

Voltage balance in the third embodiment

| Parallel circuit | 1 | 2 | 3 | 4 |
|---|---|---|---|---|
| Voltage (p.u.) | 1.0039 | 0.9961 | 1.0039 | 0.9961 |
| Voltage phase (degree) | 0.078 | −0.078 | 0.078 | −0.078 |

As described above, in the third embodiment of the present invention, the balance satisfying the reference values in the Literature 2 can be realized with respect to the voltages in parallel circuits, and a circulating current can be decreased. Further, in the third embodiment of the present invention, the jumper wires 20a are provided only on the connection side as shown in FIG. 7. The number of jumper wires 20a on the connection side can be decreased to eight per a phase. Therefore, the spaces among the jumper wires 20a are increased. This improves the workability of connecting the jumper wires, and ensures the fixing strength without difficult, providing a reliable armature. Further, as the number of jumper wires is decreased, the number of man-hours needed to provide the jumper wires is off course decreased.

This embodiment is not limited to the configuration shown in the drawing. The lead-out position may be changed, and the coil pieces placed at the electrically equivalent positions in the parallel circuits 1 and 3 may be replaced.

Fourth Embodiment

Figure 4:
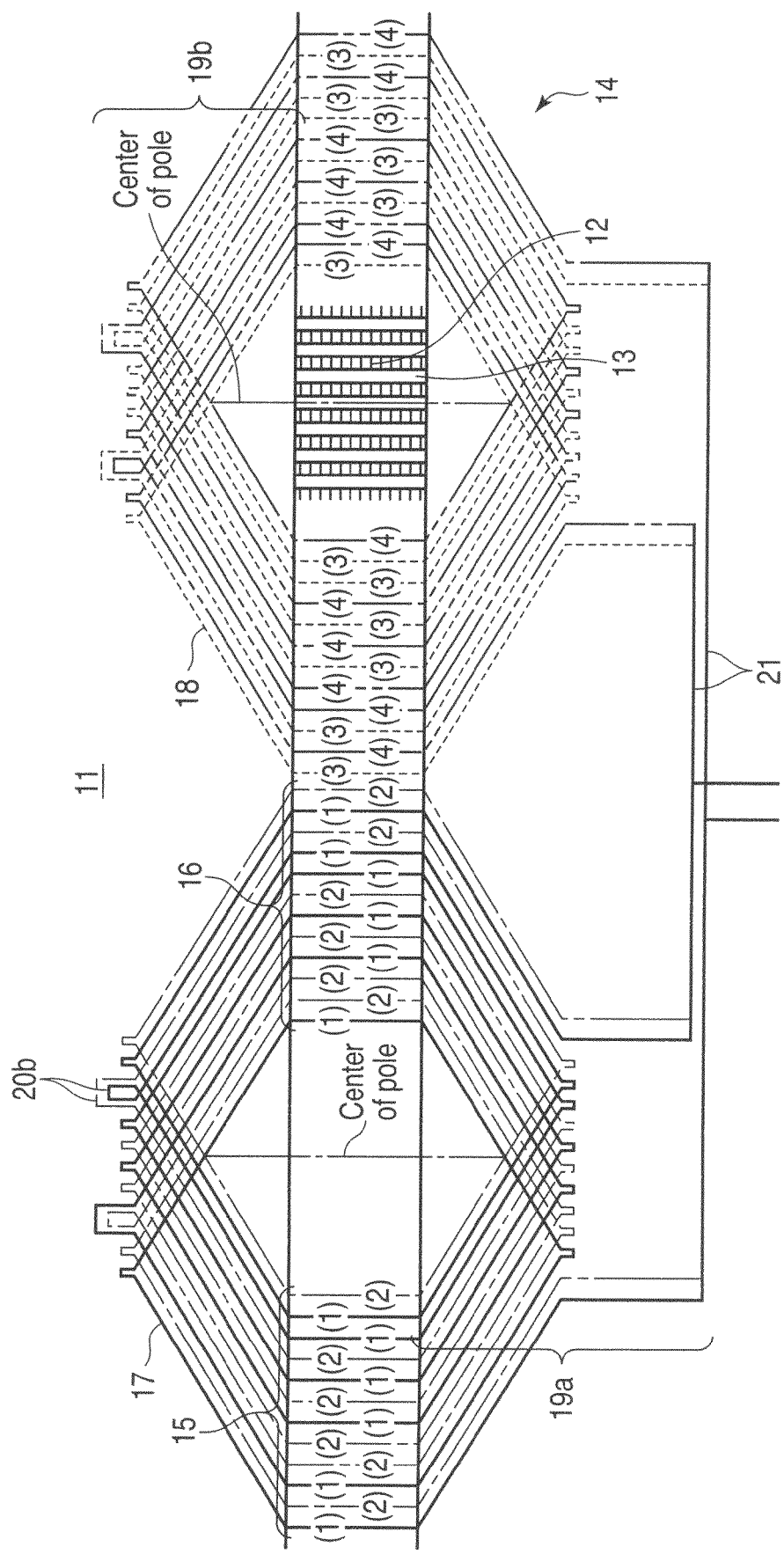
FIG. 4 is a developed perspective view of a fourth embodiment of an armature according to the present invention, showing a part for one phase.

Next, a fourth embodiment of the armature according to the present invention will be explained by referring to FIG. 4. FIG. 4 is a developed perspective view of an armature according to a fourth embodiment of the present invention, showing a part for one phase. An armature 11 has seventy-two slots 13 in an armature core 12 consisting of a laminated core. A two-pole three-phase armature winding 14 having four parallel circuits is provided in two layers in the slots 13.

The armature winding 14 of each phase has upper coil pieces 15 housed in the upper part of the slots 13, and lower coil pieces 16 housed in the lower part of the slots 13. The end portions of these upper and lower coil pieces 15 and 16 are connected in series at a connection side coil end 19a, and at an opposite side coil end 19b that is axially opposite to the connection side coil end and not connected to a winding lead-out portion. The armature winding 14 also has a first phase belt 17 and a second phase belt 18, each of which houses the upper and lower coil pieces 15 and 16 in twelve slots 13 of the armature core 12.

The armature winding 14 of each phase has four parallel circuits. The parallel circuits are identified by numbers 1, 2, 3 and 4.

The upper coil pieces 15 in each of the phase belts 17 and 18 are connected to the corresponding lower coil pieces 16 separated by a fixed pitch, at the connection coil end 19a and opposite side coil end 19b, thereby forming four parallel circuits. The parallel circuits are connected in parallel through the lead-out conductor 21 provided at the connection side coil end 19a, forming the armature winding 14.

In FIG. 4, by providing eight jumper wires 20b per a phase at the opposite side coil end 19b of each of the phase belts 17 and 18, the parallel circuits corresponding to the upper coil pieces 15 in the first phase belt 17 are numbered 2, 1, 1, 2, 1, 2, 1, 2, 2, 1, 2, 1 from the center of a pole, and the parallel circuits corresponding to the lower coil pieces 16 are numbered 1, 2, 2, 1, 2, 1, 2, 1, 1, 2, 1, 2 from the center of a pole. The parallel circuits corresponding to the upper coil pieces 15 in the second phase belt 18 are numbered 4, 3, 3, 4, 3, 4, 3, 4, 4, 3, 4, 3 from the center of a pole, and the parallel circuits corresponding to the lower coil pieces 16 are numbered 3, 4, 4, 3, 4, 3, 3, 4, 3, 4 from the center of a pole.

Therefore, when the relative positions of the upper and lower coil pieces 15 and 16 in one of the phase belts 17 and 18 are indicated by the positions from the center of a pole, the positions of the upper and lower coil pieces 15 and 16 in each parallel circuit are as shown in Table 8. Six upper coil pieces 15 in each of the first and third parallel circuits are located at the 2$^{nd}$, 3$^{rd}$, 5$^{th}$, 7$^{th}$, 10$^{th}$, and 12$^{th}$ positions from the center of a pole, and six lower coil pieces 16 are located at the 1$^{st}$, 4$^{th}$, 6$^{th}$, 8$^{th}$, 9$^{th}$ and 11$^{th}$ positions from the center of a pole. Six upper coil pieces 15 in each of the second and fourth parallel circuits are located at the 1$^{st}$, 4$^{th}$, 6$^{th}$, 8$^{th}$, 9$^{th}$ and 11$^{th}$ positions from the center of a pole, and six lower coil pieces 16 are located at the 2$^{nd}$, 3$^{rd}$, 5$^{th}$, 7$^{th}$, 10$^{th}$ and 12$^{th}$ positions from the center of a pole.

TABLE 8

Arrangement of upper and lower coils in the fourth embodiment

| | | Relative positions from the center of pole | | | | | |
|---|---|---|---|---|---|---|---|
| | | 1 | 2 | 3 | 4 | 5 | 6 |
| Parallel circuits 1 and 3 | Upper coil piece | | 1 | 1 | | 1 | |
| | Lower coil piece | 1 | | | 1 | | 1 |
| Parallel circuits 2 and 4 | Upper coil piece | 1 | | | 1 | | 1 |
| | Lower coil piece | | 1 | 1 | | 1 | |

| | | Relative positions from the center of pole | | | | | |
|---|---|---|---|---|---|---|---|
| | | 7 | 8 | 9 | 10 | 11 | 12 |
| Parallel circuits 1 and 3 | Upper coil piece | 1 | | | 1 | | 1 |
| | Lower coil piece | | 1 | 1 | | 1 | |
| Parallel circuits 2 and 4 | Upper coil piece | | 1 | 1 | | 1 | |
| | Lower coil piece | 1 | | | 1 | | 1 |

Table 9 shows the balance among the voltages generated in the armature according to the fourth embodiment of the present invention. The balance varies with a coil pitch in this embodiment. Table 7 shows the case where a coil pitch is $^{30}\!/_{36}$ (83.33%). As shown in Table 7, in the armature according to the fourth embodiment of the present invention, a voltage deviation (deviation from 1.0 of the p. u. voltage) is 0.00% maximum, and a phase angle deviation is 0.02°, which are higher than the values in the Literature 1, and satisfy the reference voltage deviation of 0.4% and reference phase angle deviation of 0.15° or lower in the Literature 2.

TABLE 9

Voltage balance in the fourth embodiment

| Parallel circuit | 1 | 2 | 3 | 4 |
|---|---|---|---|---|
| Voltage (p.u.) | 1.0000 | 1.0000 | 1.0000 | 1.0000 |
| Voltage phase (degree) | 0.018 | −0.018 | 0.018 | −0.018 |

Table 10 shows the maximum values of voltage deviation and phase angle deviation varied with a coil pitch (a winding pitch) in the fourth embodiment of the present invention. In a practical range of coil pitch, the balance is always higher than the value in the patent of Literature 1, and satisfies the reference voltage deviation of 0.4% and reference phase angle deviation of 0.15°.

TABLE 10

Relation between coil pitch and unbalanced voltage in the fourth embodiment

| Coil pitch | 36/36 | 33/36 | 30/36 | 27/36 | 24/36 | 21/36 |
|---|---|---|---|---|---|---|
| Voltage deviation | 0.00% | 0.00% | 0.00% | 0.00% | 0.00% | 0.00% |
| Phase angle deviation | 0.08° | 0.05° | 0.02° | 0.02° | 0.05° | 0.10° |

As described above, in the fourth embodiment of the present invention, the balance higher than the value in the patent of Literature 2 can be realized with respect to the voltages in parallel circuits, and a circulating current can be decreased. Therefore, a temperature increase in the armature winding is reduced, and a reliable armature winding is provided. The number of jumper wires 20b can be decreased to eight per a phase in the fourth embodiment of the present invention, and the spaces among the jumper wires 20b are increased.

Further, the jumper wires 20b are provided at the coil end 19b opposite to the connection side, and an interference with the lead-out conductor 21 can be avoided. This improves the workability of connecting the jumper wires, and ensures the fixing strength with ease, providing a reliable armature.

Further, as the number of jumper wires is reduced, the number of man-hours needed to provide the jumper wires is off course decreased.

Figure 5:
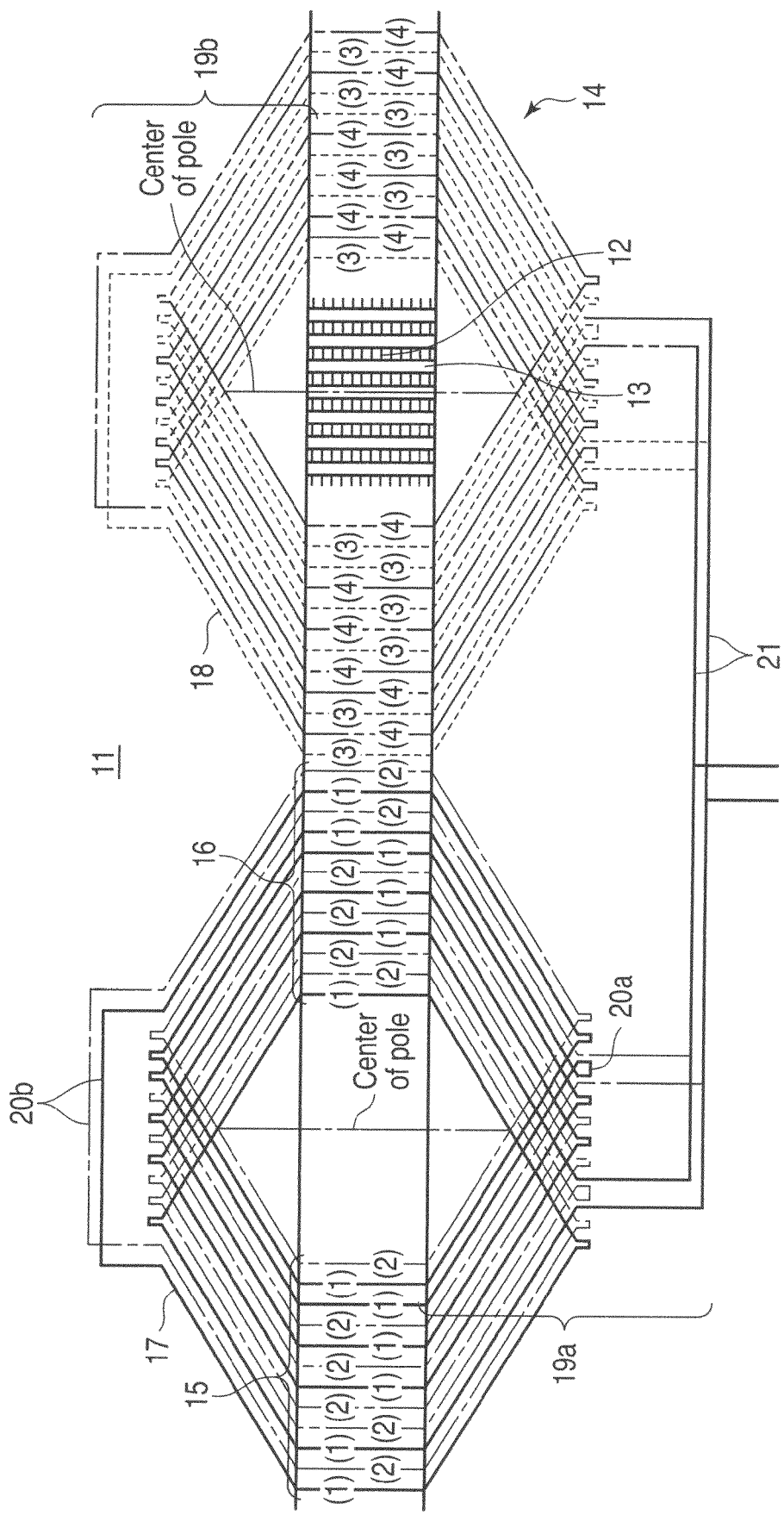
FIG. 5 is a developed perspective view of a modification of a fourth embodiment of an armature according to the present invention, showing a part for one phase.

Next, an explanation will be given on a modification of the fourth embodiment of the armature according to the present invention by referring to FIG. 5. FIG. 5 is a developed perspective view of a modification of the armature according to the fourth embodiment of the present invention, showing a part for one phase. An armature 11 has seventy-two slots 13 in an armature core 12 consisting of a laminated core. A two-pole three-phase armature winding 14 having four parallel circuits is provided in two layers in the slots 13.

The armature winding 14 of each phase has upper coil pieces 15 housed in the upper part of the slots 13, and lower coil pieces 16 housed in the lower part of the slots 13. The end portions of these upper and lower coil pieces 15 and 16 are connected in series at a connection side coil end 19a, and at an opposite side coil end 19b that is opposite to the connection side coil end in the axial direction and not connected to a winding lead-out portion. The armature winding 14 also has a first phase belt 17 and a second phase belt 18, each of which houses the upper and lower coil pieces 15 and 16 in twelve slots 13 of the armature core 12.

The armature winding 14 of each phase has four parallel circuits. The parallel circuits are identified by numbers 1, 2, 3 and 4.

The upper coil pieces 15 in each of the phase belts 17 and 18 are connected to the corresponding lower coil pieces 16 separated by a fixed coil pitch, at the connection coil end 19a and opposite side coil end 19b, and is connected to the corresponding coil pieces 16 by the jumper wires 20b provided at the opposite side coil end 19b, thereby forming four parallel circuits. The parallel circuits are connected in parallel through the lead-out conductor 21 provided at the connection side coil end 19a, forming the armature winding 14.

In FIG. 5, by providing two jumper wires 20a per a phase at the connection side coil end 19a of each of the phase belts 17 and 18, and four jumper wires 20b for each phase at the opposite side coil end 19b, the parallel circuits corresponding to the upper coil pieces 15 in the first phase belt 17 are numbered 2, 1, 1, 2, 1, 2, 1, 2, 2, 1, 2, 1 from the center of a pole, and the parallel circuits corresponding to the lower coil pieces 16 are numbered 1, 2, 2, 1, 2, 1, 2, 1, 1, 2, 1, 2 from the center of a pole. The parallel circuits corresponding to the upper coil pieces 15 in the second phase belt 18 are numbered 4, 3, 3, 4, 3, 4, 3, 4, 4, 3, 4, 3 from the center of a pole, and the parallel circuits corresponding to the lower coil pieces 16 are numbered 3, 4, 4, 3, 4, 3, 4, 3, 3, 4, 3, 4 from the center of a pole.

The above arrangement of coil pieces is the same as the fourth embodiment of the present invention, and the electrical function and effect are also the same. The number of jumper wires 20a and 20b can be decreased to eight per a phase, the spaces among the jumper wires 20a and 20b can be increased. As very short jumper wire pairs are provided so as to be adjacent to each other (in FIG. 4, in nesting structure) in the fourth embodiment of the present invention, it is difficult to ensure spaces to fix the jumper wires 20b. In the modification of the fourth embodiment, the jumper wires 20b provided on the side opposite to the connection side are long, and spaces to fix the jumper wires can be ensured, and the fixing of the jumper wires is easy. The jumper wires 20a provided on the connection side are very short as in the fourth embodiment, but there is no adjacent jumper wires, and the jumper wires can be easily fixed, and the insulation and fixing strength of the connection part are easily ensured. Therefore, a reliable armature can be provided. As the number of jumper wires is decreased, the number of man-hours needed to provide the jumper wires is off course decreased. Further, according to the embodiment shown in FIG. 4 and the modification shown in FIG. 5, the lead-out connection conductors of different phases are not concentrated (arranged almost evenly). This improves insulation reliability, as well as increasing workability.

This embodiment is not limited to the configuration shown in the drawing. The position of the lead-out conductor 21 may be changed, and the coil pieces placed at the electrically equivalent positions in the parallel circuits 1 and 3 may be replaced.

In FIG. 5, the coils indicated by solid lines and chain lines in the first phase belt 17 may be reversed, and the coils indicated by broken lines and chain double-dashed lines in the second phase belt 18 may be reversed.

Fifth Embodiment

Figure 6:
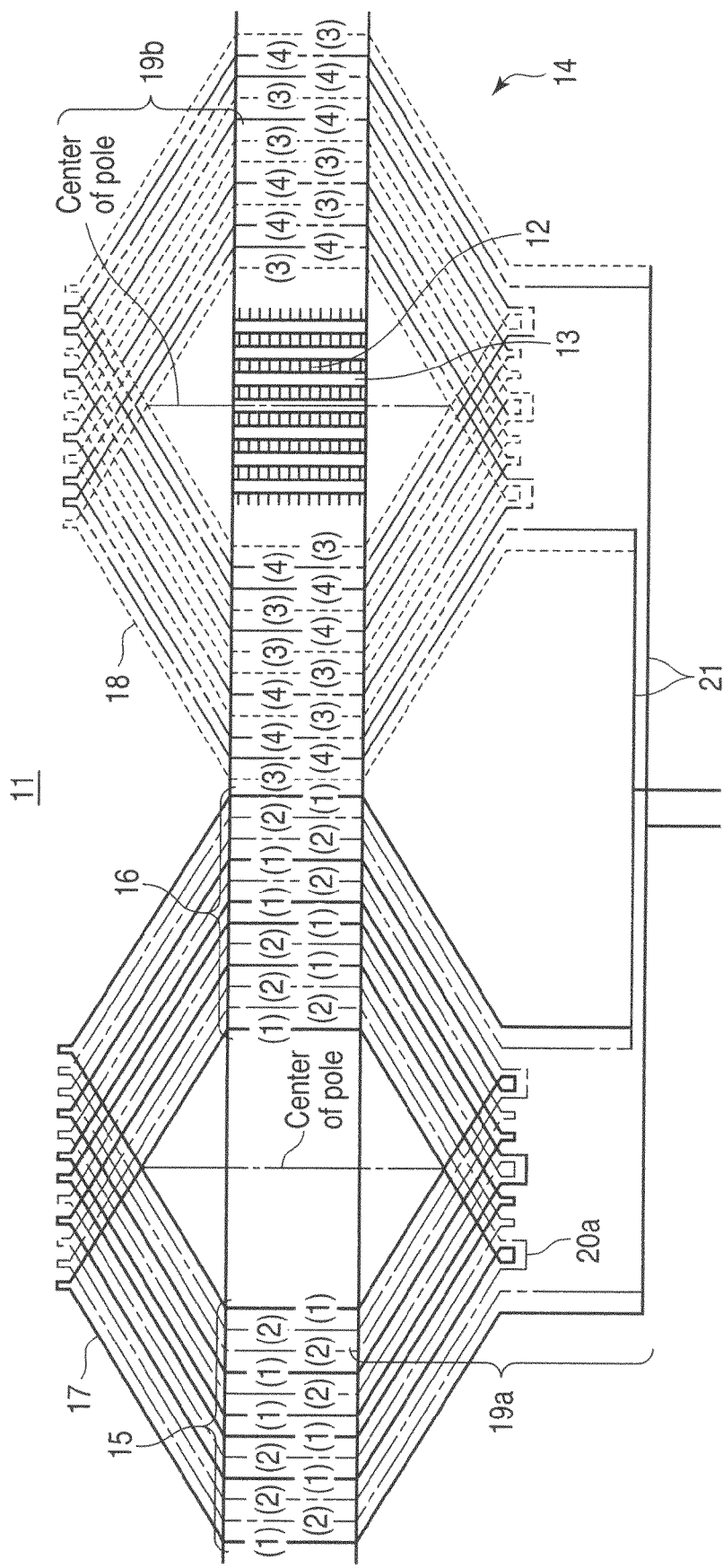
FIG. 6 is a developed perspective view of a fifth embodiment of an armature according to the present invention, showing a part for one phase.

Next, a fifth embodiment of the armature according to the present invention will be explained by referring to FIG. 6. FIG. 6 is a developed perspective view of an armature according to a fifth embodiment of the present invention, showing a part for one phase. An armature 11 has seventy-two slots 13 in an armature core 12 consisting of a laminated core. A two-pole three-phase armature winding 14 having four parallel circuits is provided in two layers in the slots 13.

The armature winding 14 of each phase has upper coil pieces 15 housed in the upper part of the slots 13, and lower coil pieces 16 housed in the lower part of the slots 13. The end portions of these upper and lower coil pieces 15 and 16 are connected in series at a connection side coil end 19*a*, and at an opposite side coil end 19*b* that is opposite to the connection side coil end in the axial direction and not connected to a winding lead-out portion. The armature winding 14 also has a first phase belt 17 and a second phase belt 18, each of which houses the upper and lower coil pieces 15 and 16 in twelve slots 13 of the armature core 12.

The armature winding 14 of each phase has four parallel circuits. The parallel circuits are identified by numbers 1, 2, 3 and 4.

The upper coil pieces 15 in each of the phase belts 17 and 18 are connected to the corresponding lower coil pieces 16 separated by a fixed coil pitch, at the connection side coil end 19*a* and opposite side coil end 19*b*, thereby forming four parallel circuits. The parallel circuits are connected in parallel through the lead-out conductor 21 provided at the connection side coil end 19*a*, forming the armature winding 14.

In FIG. 6, by providing twelve jumper wires 20*a* per a phase, two wires making one set, at the connection side coil end 19*a* of each of the phase belts 17 and 18, the parallel circuits corresponding to the upper and lower coil pieces 15 and 16 in the first phase belt 17 are numbered 1, 2, 2, 1, 2, 1, 1, 2, 1, 2, 2, 1 from the center of a pole, and the parallel circuits corresponding to the upper and lower coil pieces 15 and 16 are numbered 3, 4, 4, 3, 4, 3, 3, 4, 3, 4, 4, 3 from the center of a pole.

The jumper wires 20*a* are provided in pairs so as to be adjacent to each other (in FIG. 6, in nesting structure). For example, the 1$^{st}$ and 2$^{nd}$ lower coil pieces 16 counted from the center of a pole of the first phase belt are connected to the 9$^{th}$ and 10$^{th}$ upper coil pieces 15, for example. In this case, the jumper wires are connected, so that the parallel circuits of two pairs of upper and lower coil pieces connected by the jumper wires 20*a* are numbered 1 and 2 from the center of a pole.

The arrangement of coil pieces in FIG. 6 is the same as that in the Literature 1 shown in FIG. 7, and the electrical function and effect are also the same. However, in the embodiment in FIG. 6, the jumper wires 20*a* are provided in pairs, and connected so that the parallel circuits of all pairs of upper and lower coil pieces connected by the jumper wires 20*a* are given the same numbers counted from the center of a pole. Therefore, the total number of jumper wires 20*a* is decreased to twelve per a phase, lower than the number in the patent of the Literature 1, and the spaces among the jumper wires 20*a* are increased. This easily ensures insulation and fixing strength of the connection part, providing a reliable armature. Further, as the number of jumper wires 20*a* is decreased, the number of man-hours needed to provide the jumper wires 20*a* is off course decreased.

As described above, according to the embodiments of the present invention, there is provided an armature, in which the unbalance among the voltages in the parallel circuits is decreased, losses caused by a circulating current among the parallel circuits are decreased, the workability in locations to connect jumper wires is improved, and the insulation and fixing strength are easily ensured in the configuration of an armature winding.

<Modification>

The present invention may be embodied in other specific forms in a practical stage without departing from its spirits or essential characteristics. The embodiments of the present invention may be appropriately combined. In such a case, the effect of combination will be obtained. Further, the embodiments described herein include various stages of the present invention, and the present invention may be embodied in various forms by appropriately combining the constituent elements disclosed herein. For example, when the present invention is embodied by omitting some of the constituent elements shown in the embodiments, the omitted elements may be appropriately compensated by a known technique. The present invention is explained herein by using a three-phase two-pole example having 72 slots. This is of course applicable to three-phase four-pole having 144 slots.

What is claimed is:

1. An armature comprising:
an armature core with 72 slots; and
an armature winding that is a three-phase two-pole armature winding wound in two layers, and is housed in the slots, each phase having first, second, third and fourth parallel circuits, each parallel circuit having a serial coil, each serial coil having upper and lower coil pieces connected to each other at a connection side coil end and at a coil end opposite to the connection side, the coil pieces divided into first and second phase belts,
the upper and lower coil pieces in the first and third parallel circuits being located at the 1$^{st}$, 4$^{th}$, 6$^{th}$, 7$^{th}$, 10$^{th}$ and 12$^{th}$ positions, and the upper and lower coil pieces in the second and fourth parallel circuits being located at the 2$^{nd}$, 3$^{rd}$, 5$^{th}$, 8$^{th}$, 9$^{th}$ and 11$^{th}$ positions, when relative positions of the upper and lower coil pieces in one of the first and second phase belts are indicated by positions counted in a direction separating away from a center of a pole.

2. The armature according to claim 1, wherein a winding pitch of the armature winding is set to $^{24}/_{36}$ to $^{34}/_{36}$.

3. The armature according to claim 1, wherein:
the parallel circuits corresponding to the upper and lower coil pieces in the first phase belt are numbered 1, 2, 2, 1, 2, 1, 1, 2, 2, 1, 2, 1 in a direction separating away from the center of the pole; and
the parallel circuits corresponding to the upper and lower coil pieces in the second phase belt are numbered 3, 4, 4, 3, 4, 3, 3, 4, 4, 3, 4, 3 in a direction separating away from the center of the pole.

4. An armature comprising:
an armature core with 72 slots; and
an armature winding that is a three-phase two-pole armature winding wound in two layers, and is housed in the slots, each phase having first, second, third and fourth parallel circuits, each parallel circuit having a serial coil, each serial coil having upper and lower coil pieces connected to each other at a connection side coil end and at a coil end opposite to the connection side, the coil pieces divided into first and second phase belts, the upper coil pieces in the first and third parallel circuits being located at the $2^{nd}$, $4^{th}$, $5^{th}$, $7^{th}$, $9^{th}$ and $12^{th}$ positions, the lower coil pieces in the first and third parallel circuits being located at the $1^{st}$, $4^{th}$, $6^{th}$, $8^{th}$, $9^{th}$ and $11^{th}$ positions, the upper coil pieces in the second and fourth parallel circuits being located at the $1^{st}$, $3^{rd}$, $6^{th}$, $8^{th}$, $10^{th}$ and $11^{th}$ positions, and the lower coil pieces in the second and fourth parallel circuits being located at the $2^{nd}$, $3^{rd}$, $5^{th}$, $7^{th}$, $10^{th}$ and $12^{th}$ positions, when relative positions of the upper and lower coil pieces in one of the first and second phase belts are indicated by positions counted in a direction separating away from a center of a pole.

5. The armature according to claim 4, wherein:
the parallel circuits corresponding to the upper coil pieces in the first phase belt are numbered 2, 1, 2, 1, 1, 2, 1, 2, 1, 2, 2, 1 in a direction separating away from the center of the pole, and the parallel circuits corresponding to the lower coil pieces in the first phase belt being numbered 1, 2, 2, 1, 2, 1, 2, 1, 1, 2, 1, 2 in a direction separating away from the center of the pole; and
the parallel circuits corresponding to the upper coil pieces in the second phase belt are numbered 4, 3, 4, 3, 3, 4, 3, 4, 3, 4, 4, 3 in a direction separating away from the center of the pole, and the parallel circuits corresponding to the lower coil pieces in the second phase belt being numbered 3, 4, 4, 3, 4, 3, 4, 3, 3, 4, 3, 4 in a direction separating away from the center of the pole.

6. An armature comprising:
an armature core with 72 slots; and
an armature winding that is a three-phase two-pole armature winding wound in two layers, and is housed in the slots, each phase having first, second, third and fourth parallel circuits, each parallel circuit having a serial coil, each serial coil having upper and lower coil pieces connected to each other at a connection side coil end and coil end opposite to the connection side, the coil pieces divided into first and second phase belts,
the upper coil pieces in the first and third parallel circuits being located at the $2^{nd}$, $3^{rd}$, $5^{th}$, $7^{th}$, $10^{th}$ and $12^{th}$ positions, the lower coil pieces in the first and third parallel circuits being located at the $1^{st}$, 3rd, $6^{th}$, $8^{th}$, $10^{th}$ and $11^{th}$ positions, the upper coil pieces in the second and fourth parallel circuits being located at the $1^{st}$, $4^{th}$, $6^{th}$, $8^{th}$, $9^{th}$ and $11^{th}$ positions, and the lower coil pieces in the second and fourth parallel circuits being located at the $2^{nd}$, $4^{th}$, $5^{th}$, $7^{th}$, $9^{th}$ and $12^{th}$ positions, when relative positions of the upper and lower coil pieces in one of the first and second phase belts are indicated by positions counted in a direction separating away from a center of a pole.

7. The armature according to claim 6, wherein:
the parallel circuits of the upper coil pieces in the first phase belt are numbered 2, 1, 1, 2, 1, 2, 1, 2, 2, 1, 2, 1 in a direction separating away from the center of the pole, and the parallel circuits of the lower coil pieces in the first phase belt are numbered 1, 2, 1, 2, 2, 1, 2, 1, 2, 1, 1, 2 in a direction separating away from the center of the pole; and
the parallel circuits of the upper coil pieces in the second phase belt are numbered 4, 3, 3, 4, 3, 4, 3, 4, 4, 3, 4, 3 in a direction separating away from the center of the pole, and the parallel circuits of the lower coil pieces in the second phase belt are numbered 3, 4, 3, 4, 4, 3, 4, 3, 4, 3, 3, 4 in a direction separating away from the center of the pole.

8. An armature comprising:
an armature core with 72 slots; and
an armature winding that is a three-phase two-pole armature winding wound in two layers, and is housed in the slots, each phase having first, second, third and fourth parallel circuits, each parallel circuit having a serial coil, each serial coil having upper and lower coil pieces connected to each other at a connection side coil end and at a coil end opposite to the connection side, the coil pieces divided into first and second phase belts,
the upper coil pieces in the first and third parallel circuits being located at the $2^{nd}$, $3^{rd}$, $5^{th}$, $7^{th}$, $10^{th}$ and $12^{th}$ positions, the lower coil pieces in the first and third parallel circuits being located at the $1^{st}$, $4^{th}$, $6^{th}$, $8^{th}$, $9^{th}$ and $11^{th}$ positions, the upper coil pieces in the second and fourth parallel circuits being located at the $1^{st}$, $4^{th}$, $6^{th}$, $8^{th}$, $9^{th}$ and $11^{th}$ positions, and the lower coil pieces in the second and fourth parallel circuits being located at the $2^{nd}$, $3^{rd}$, $5^{th}$, $7^{th}$, $10^{th}$ and $12^{th}$ positions, when relative positions of the upper and lower coil pieces in one of the first and second phase belts are indicated by positions counted in a direction separating away from a center of a pole.

9. The armature according to claim 8, wherein:
the parallel circuits of the upper coil pieces in the first phase belt are numbered 2, 1, 1, 2, 1, 2, 1, 2, 2, 1, 2, 1 in a direction separating away from the center of the pole, and the parallel circuits of the lower coil pieces in the first phase belt are numbered 1, 2, 2, 1, 2, 1, 2, 1, 1, 2, 1, 2 in a direction separating away from the center of the pole; and
the parallel circuits of the upper coil pieces in the second phase belt are numbered 4, 3, 3, 4, 3, 4, 3, 4, 4, 3, 4, 3 in a direction separating away from the center of the pole, and the parallel circuits of the lower coil pieces in the second phase belt are numbered 3, 4, 4, 3, 4, 3, 4, 3, 3, 4, 3, 4 in a direction separating away from the center of the pole.

10. The armature according to claim 8, wherein eight jumper wires per a phase are provided at the coil end opposite to the connection side to connect the upper and lower coil pieces.

11. The armature according to claim 8, wherein four jumper wires per a phase are provided at the coil end opposite to the connection side to connect the upper and lower coil pieces, and four jumper wires per a phase are provided at the connection side coil end to connect the upper and lower coil pieces.

12. An armature comprising:
an armature core with 72 slots; and
an armature winding that is a three-phase two-pole armature winding wound in two layers, and is housed in the slots, each phase having first, second, third and fourth parallel circuits, each parallel circuit having a serial coil, each serial coil having upper and lower coil pieces connected to each other at a connection side coil end and at a coil end opposite to the connection side, the coil pieces divided into first and second phase belts,
the armature winding including jumper wires provided at the connection side coil end to connect the upper and lower coil pieces, the jumper wires being provided in pairs so as to be adjacent to each other, and the parallel circuits of pairs of upper and lower coil pieces connected by the jumper wires are given the same numbers counted from the center of a pole.

13. The armature according to claim 12, wherein:
six pairs of twelve jumper wires are provided at the connection side coil end to connect the upper and lower coil pieces; and
the parallel circuits in the first phase belt are numbered 1, 2, 2, 1, 2, 1, 1, 2, 1, 2, 2, 1 in a direction separating away from the center of the pole, and the parallel circuits in the second phase belt are numbered 3, 4, 4, 3, 4, 3, 3, 4, 3, 4, 4, 3 in a direction separating away from the center of the pole.

* * * * *